United States Patent
Otsubo et al.

(10) Patent No.: US 7,436,586 B2
(45) Date of Patent: Oct. 14, 2008

(54) WAVELENGTH CONVERSION SYSTEM, OPTICAL INTEGRATED DEVICE AND WAVELENGTH CONVERSION METHOD

(75) Inventors: Koji Otsubo, Kawasaki (JP); Haruhiko Kuwatsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/360,662

(22) Filed: Feb. 24, 2006

(65) Prior Publication Data

US 2006/0279835 A1    Dec. 14, 2006

(30) Foreign Application Priority Data

Sep. 6, 2005    (JP)    ............................. 2005-258318

(51) Int. Cl.
- H01S 4/00 (2006.01)
- H01S 5/00 (2006.01)
- G02F 1/225 (2006.01)

(52) U.S. Cl. .................. 359/344; 359/326; 359/332; 359/338

(58) Field of Classification Search ................ 359/326, 359/332, 338, 344
See application file for complete search history.

(56) References Cited

U.S. PATENT DOCUMENTS

| | | | |
|---|---|---|---|
| 4,775,215 A * | 10/1988 | Teng et al. .............. | 385/143 |
| 5,619,368 A * | 4/1997 | Swanson .................. | 359/326 |
| 5,920,588 A * | 7/1999 | Watanabe ................. | 372/96 |
| 6,344,921 B1 * | 2/2002 | Galvanauskas et al. ..... | 359/332 |
| 6,453,082 B1 * | 9/2002 | Watanabe ................. | 385/15 |
| 6,477,300 B2 * | 11/2002 | Watanabe et al. .......... | 385/42 |
| 6,522,462 B2 * | 2/2003 | Chu et al. ................ | 359/344 |
| 6,542,286 B2 * | 4/2003 | Kuwatsuka ............... | 359/332 |

(Continued)

FOREIGN PATENT DOCUMENTS

EP    774810 A2 *   5/1997

(Continued)

OTHER PUBLICATIONS

Razzari, L. et al., "Wavelength Conversion and Pulse Reshaping Through Cascaded Interaction in an MZI Configuration", IEEE Journal of Quantum Electronics, vol. 39, No. 11, Nov. 2003, pp. 1486-1491.*

(Continued)

*Primary Examiner*—Eric Bolda
(74) *Attorney, Agent, or Firm*—Kratz, Quintos & Hanson, LLP.

(57) ABSTRACT

A wavelength conversion system includes a Mach-Zehnder interferometer including two optical waveguides, a non-linear medium provided on one of the two optical waveguides, and a branching ratio adjuster for adjusting the branching ratio of multiplexed light produced by multiplexing signal light and pumping light so that the powers of the signal light and the pumping light which are to be emitted from the two optical waveguides are equal to each other. The multiplexed light whose branching ratio is adjusted by the branching ratio adjuster is introduced into the two optical waveguides such that the non-linear medium generates phase conjugation light of the signal light and the light guided through the one optical waveguide and the light guided through the other one of the two optical waveguides interfere with each other so that the phase conjugation light is extracted as wavelength conversion light.

12 Claims, 6 Drawing Sheets

U.S. PATENT DOCUMENTS

| | | | |
|---|---|---|---|
| 6,608,854 B1 * | 8/2003 | Watanabe | 372/96 |
| 6,853,774 B2 * | 2/2005 | Watanabe | 385/39 |
| 6,867,903 B2 * | 3/2005 | Imajuku et al. | 359/330 |
| 7,012,740 B2 * | 3/2006 | Imajuku et al. | 359/330 |
| 7,072,549 B2 * | 7/2006 | Watanabe | 385/122 |
| 7,130,112 B2 * | 10/2006 | Morito | 359/344 |
| 2001/0031110 A1 * | 10/2001 | Imajuku et al. | 385/15 |
| 2003/0063860 A1 * | 4/2003 | Watanabe | 385/39 |
| 2004/0136050 A1 * | 7/2004 | Takagi | 359/326 |

FOREIGN PATENT DOCUMENTS

| | | |
|---|---|---|
| EP | 1184715 | 3/2002 |
| EP | 1255157 | 11/2002 |
| JP | 2000-250081 | 9/2000 |
| JP | 2002182256 A * | 6/2002 |
| JP | 2004-185021 | 7/2004 |
| WO | WO 99/25081 | 5/1999 |
| WO | WO0142848 A2 * | 11/2000 |

OTHER PUBLICATIONS

Communication from the European Patent Office, showing date Nov. 7, 2007.

* cited by examiner

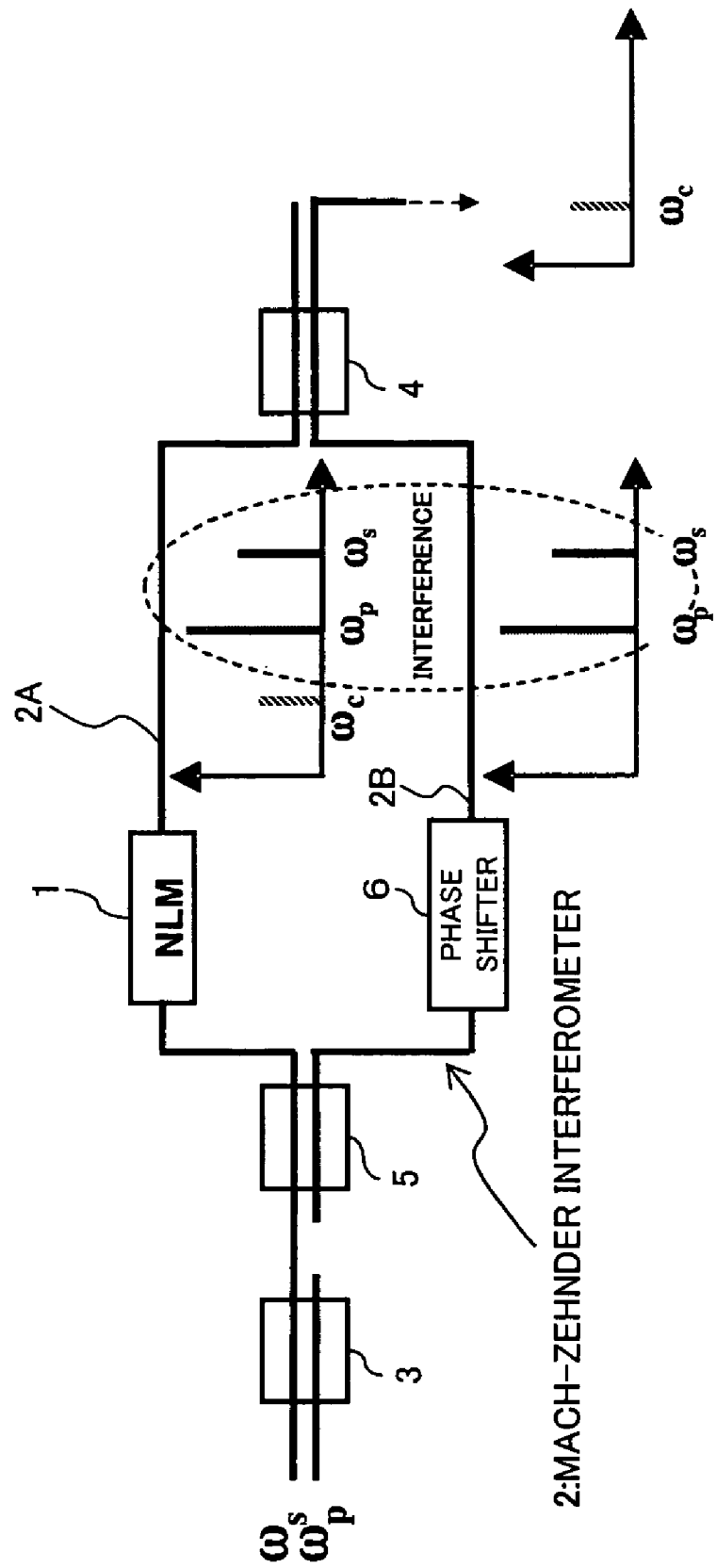

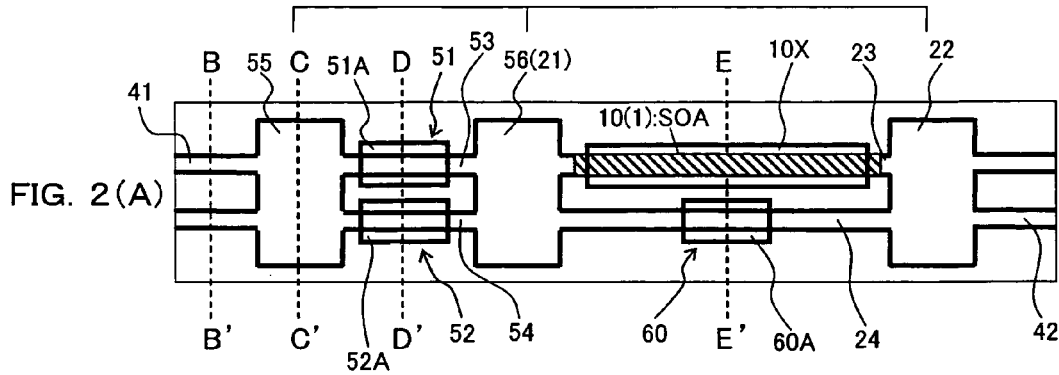
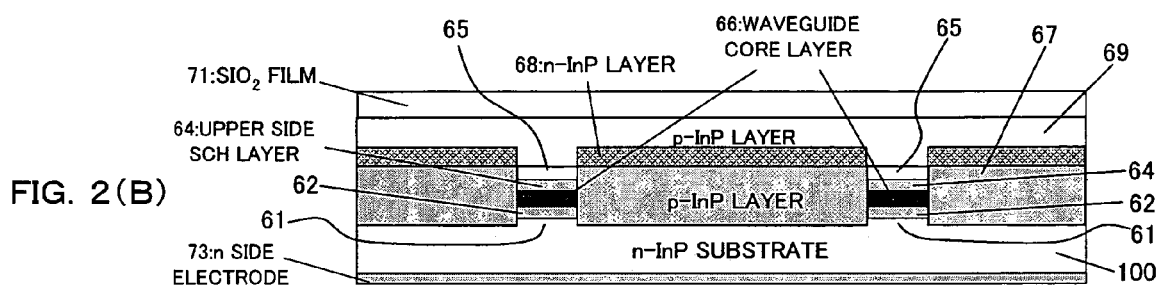
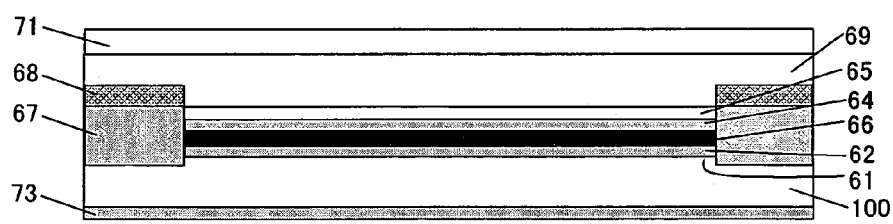
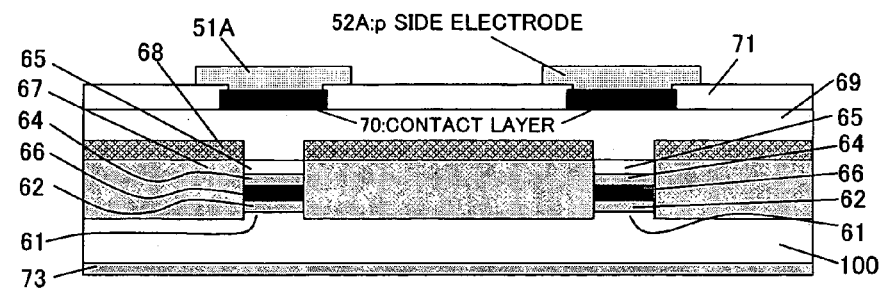
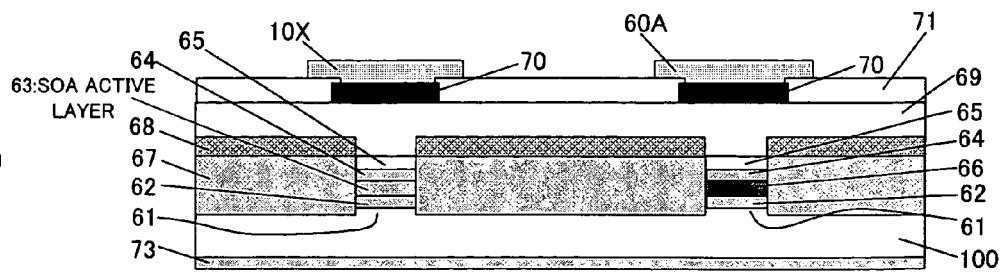

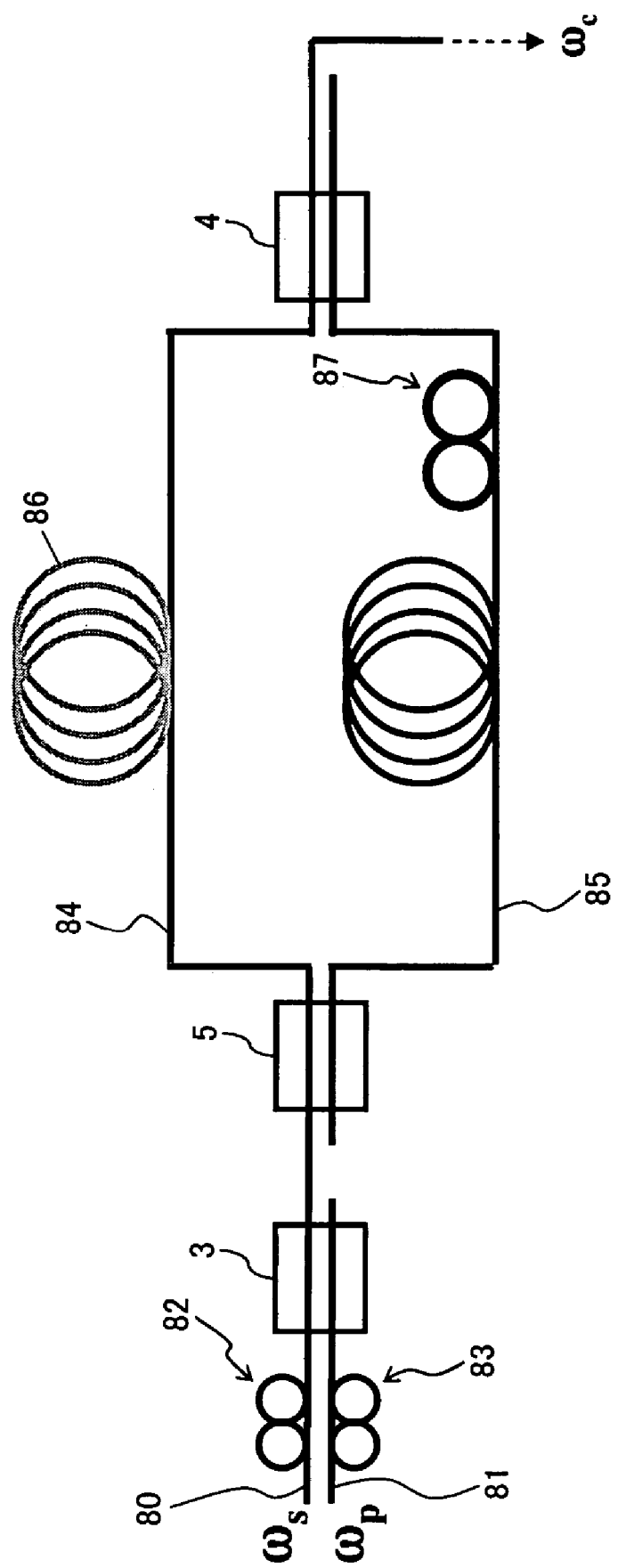

WAVELENGTH CONVERSION SYSTEM, OPTICAL INTEGRATED DEVICE AND WAVELENGTH CONVERSION METHOD

CROSS REFERENCE TO RELATED APPLICATIONS

This application is based on and hereby claims priority to Japanese Application No. 2005-258318 filed on Sep. 6, 2005 in Japan, the contents of which are hereby incorporated by reference.

BACKGROUND OF THE INVENTION (1) Field of the Invention

This invention relates to a wavelength conversion system, an optical integrated device and a wavelength conversion method.

(2) Description of the Related Art

As increase in speed and capacity of optical communication proceeds, an all-optical signal processing technique which involves no conversion of an optical signal into an electric signal to perform processing is demanded.

Thanks to the progress of wavelength division multiplexing (WDM) techniques in recent years, it is possible to fully use an entire wavelength bandwidth over several THz of silica glass optical fibers. In the WDM wherein individual ones of wavelengths of light transmit different information applied thereto, wavelength conversion for implementing prevention of wavelength conflict and exchange by wavelength routing between sub networks is an essentially required technique.

When it is tried to perform all-optical wavelength conversion, methods which utilize a non-linear medium (NLM) such as an optical fiber or a semiconductor are used frequently. Among the methods, a wavelength conversion method which uses a non-linear effect of a semiconductor optical amplifier (SOA) is studied actively because it allows miniaturization of a system and can provide a high non-linear effect with low power consumption.

All-optical wavelength conversion methods which use the SOA can be classified into those of the optical switch type which make use of cross gain modulation (XGM) or cross phase modulation (XPM) and those of the coherent type which use difference frequency generation (DFG) or four wave mixing (FWM).

Of the two methods, the wavelength conversion method of the coherent type is ready also for a modulation format such as, for example, differential phase shift keying (DPSK) because it can perform very high speed wavelength conversion due to its high non-linear responsibility and besides maintains phase information also after the wavelength conversion.

Where the wavelength conversion method which uses the DFG and the wavelength conversion method which uses the FWM are compared with each other, in the wavelength conversion method which uses the DFG which is a second-order non-linear effect, the distance between wavelengths of light which act with each other is greater than that in the conversion wavelength method which uses the FWM which makes use of a third-order non-linear effect. Therefore, the wavelength conversion method which uses the FWM is more advantageous from the point of view of the facility in establishment of phase matching.

It is to be noted that Japanese Patent Laid-Open No. 2000-250081 and Japanese Patent Laid-Open No. 2004-185021 were found through a prior art search conducted.

SUMMARY OF THE INVENTION

Incidentally, in the wavelength conversion method which uses the FWM, the phenomenon that, if signal light $\omega_s$ and pumping light $\omega_p$ are inputted to an optical waveguide made of a non-linear medium, then phase conjugate light $\omega_c$ ($=2\omega_p-\omega_s$) of the signal light is produced as seen in FIG. 6 is utilized to extract the phase conjugate light $\omega_c$ generated by the non-linear medium as wavelength conversion light.

However, also the signal light $\omega_s$ and the pumping light $\omega_p$ are outputted together with the phase conjugate light $\omega_c$.

Therefore, in order to extract only the phase conjugate light $\omega_c$ as the wavelength conversion light, a filter is used (for example, a variable wavelength filter is provided externally) to cut the signal light $\omega_s$ and the pumping light $\omega_p$.

Meanwhile, in such a wavelength conversion method as described above, in order to convert signal light (input light) of a certain wavelength into signal light (wavelength conversion light) of an arbitrary wavelength (that is, in order to adjust the wavelength of the phase conjugate light $\omega_c$ of an arbitrary wavelength as wavelength conversion light), the wavelength of the pumping light $\omega_p$ should be changed.

However, where a filter is used, the width in wavelength conversion is limited by the band of the filter. Further, another filter of a different band is sometimes required in response to the modulation speed of a signal. On the other hand, if a large number of filters are provided in order to extract phase conjugate light $\omega_c$ of an arbitrary wavelength as wavelength conversion light, then the number of parts increases as much. Further, such provision of a large number of filters is disadvantageous in achievement of miniaturization and integration of apparatus.

Further, where a variable wavelength filter is used, also it is necessary to sweep the center wavelength of the filter, and the width in wavelength conversion is limited also by the wavelength sweep range. Particularly since the wavelength sweep range is determined by the characteristic of a filter including a sweeping mechanism, actual use of the filter is restricted by various factors. Further, the wavelength conversion speed is restricted by operation of the filter.

It is an object of the present invention to provide a wavelength conversion system, an optical integrated device and a wavelength conversion method by which only wavelength conversion light can be extracted without using a filter.

In order to attain the object described above, according to an aspect of the present invention, there is provided a wavelength conversion system, comprising a Mach-Zehnder interferometer including two optical waveguides, a non-linear medium provided on one of the two optical waveguides, and a branching ratio adjustment section for adjusting the branching ratio of multiplexed light produced by multiplexing signal light and pumping light so that the powers of the signal light and the pumping light which are to be emitted from the two optical waveguides are equal to each other, the multiplexed light whose branching ratio is adjusted by the branching ratio adjustment section being introduced into the two optical waveguides such that the non-linear medium generates phase conjugation light of the signal light and the light guided through the one optical waveguide and the light guided through the other one of the two optical waveguides interfere with each other so that the phase conjugation light is extracted as wavelength conversion light.

According to another aspect of the present invention, there is provided a wavelength conversion system, comprising a Mach-Zehnder interferometer including two optical waveguides, a first non-linear medium provided on one of the two optical waveguides, and a second non-linear medium provided on the other one of the two optical waveguides and having a non-linear susceptibility different from that of the first non-linear medium, multiplexed light produced by multiplexing signal light and pumping light being branched and introduced into the two optical waveguides such that the first and second non-linear media individually generate phase conjugation light of the signal light and the light guided through the one optical waveguide and the light guided through the other one of the two optical waveguides interfere with each other so that the phase conjugation light is extracted as wavelength conversion light.

According to a further aspect of the present invention, there is provided an optical integrated device, comprising a pre-stage Mach-Zehnder interferometer including two optical waveguides for branching and guiding multiplexed light produced by multiplexing signal light and pumping light, a phase shifter provided on at least one of the two optical waveguides which form the pre-stage Mach-Zehnder interferometer, a post-stage Mach-Zehnder interferometer including an input side coupler, an output side coupler, and two optical waveguides for connecting the input side coupler and the output side coupler to each other, and a semiconductor optical amplifier provided on one of the two optical waveguides which form the pre-stage Mach-Zehnder interferometer, the multiplexed light whose branching ratio is adjusted by the pre-stage Mach-Zehnder interferometer and the phase shifter so that the powers of the signal light and the pumping light to be individually emitted from the two optical waveguides which form the post-stage Mach-Zehnder interferometer are equal to each other being introduced into the two optical waveguides which form the post-stage Mach-Zehnder interferometer such that the semiconductor optical amplifier generates phase conjugation light of the signal light and the light guided through the one optical waveguide which forms the post-stage Mach-Zehnder interferometer and the light guided through the other one of the two optical waveguides which form the post-stage Mach-Zehnder interferometer interfere with each other so that the phase conjugation light is extracted as wavelength conversion light.

According to a still further aspect of the present invention, there is provided an optical integrated device, comprising a Mach-Zehnder interferometer including an input side coupler, an output side coupler, and two optical waveguides for connecting the input side coupler and the output side coupler to each other, a first semiconductor optical amplifier provided on one of the two optical waveguides, and a second semiconductor optical amplifier provided on the other one of the two optical waveguides and having non-linear susceptibility different from that of the first semiconductor optical amplifier, multiplexed light produced by multiplexing signal light and pumping light being branched and introduced into the two optical waveguides such that the first and second semiconductor optical amplifiers individually generate phase conjugation light of the signal light and the light guided through the one optical waveguide and the light guided through the other one of the two optical waveguides interfere with each other so that the phase conjugation light is extracted as wavelength conversion light.

According to a yet further aspect of the present invention, there is provided a wavelength conversion method, comprising the steps of adjusting a branching ratio of multiplexed light produced by multiplexing signal light and pumping light emitted from two optical waveguides which form a Mach-Zehnder interferometer so that the powers of the signal light and pumping light are equal to each other, introducing the multiplexed light whose branching ratio is adjusted into the two individual optical waveguides, generating phase conjugation light of the signal light by means of a non-linear medium provided on one of the two optical waveguides, and causing the light guided through the one optical waveguide with a gain generated by the non-linear medium and the light guided through the other one of the two optical waveguides to interfere with each other so that the phase conjugation light is extracted as wavelength conversion light.

According to a yet further aspect of the present invention, there is provided a wavelength conversion method, comprising the steps of introducing multiplexed light produced by multiplexing signal light and pumping light into two optical waveguides which form a Mach-Zehnder interferometer, generating phase conjugation light of the signal light by means of a first non-linear medium provided on one of the two optical waveguides, generating phase conjugation light of the signal light by means of a second non-linear medium provided on the other one of the two optical waveguides and having a non-linear susceptibility different from that of the first non-linear medium, and causing the light guided through the one optical waveguide and the light guided through the other optical waveguide to interfere with each other so that the phase conjugation light is extracted as wavelength conversion light.

With the wavelength conversion systems, optical integrated devices and wavelength conversion methods, there is an advantage that signal light of an arbitrary wavelength, an arbitrary modulation speed and an arbitrary modulation format can be converted into wavelength conversion light of an arbitrary wavelength, and only the wavelength conversion light can be extracted without using a filter.

As a result, the number of parts can be reduced in comparison with an alternative case wherein a filter is used. Also it is possible to achieve miniaturization and integration of apparatus. Further, such a situation that the width in wavelength conversion is restricted by the bandwidth or the wavelength sweeping width of a filter is eliminated. Furthermore, also such a situation that the wavelength conversion speed is restricted by operation of a filter is eliminated, and wavelength conversion can be performed at a high speed.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a schematic view illustrating a wavelength conversion system and a wavelength conversion method according to a first embodiment of the present invention;

FIGS. 2(A) to 2(E) are schematic views illustrating a configuration and a production method of an optical integrated device according to the first embodiment of the present invention;

FIG. 3 is a schematic view showing a wavelength conversion apparatus according to a modification to the first embodiment of the present invention;

DESCRIPTION OF THE PREFERRED EMBODIMENTS

Figure 4:
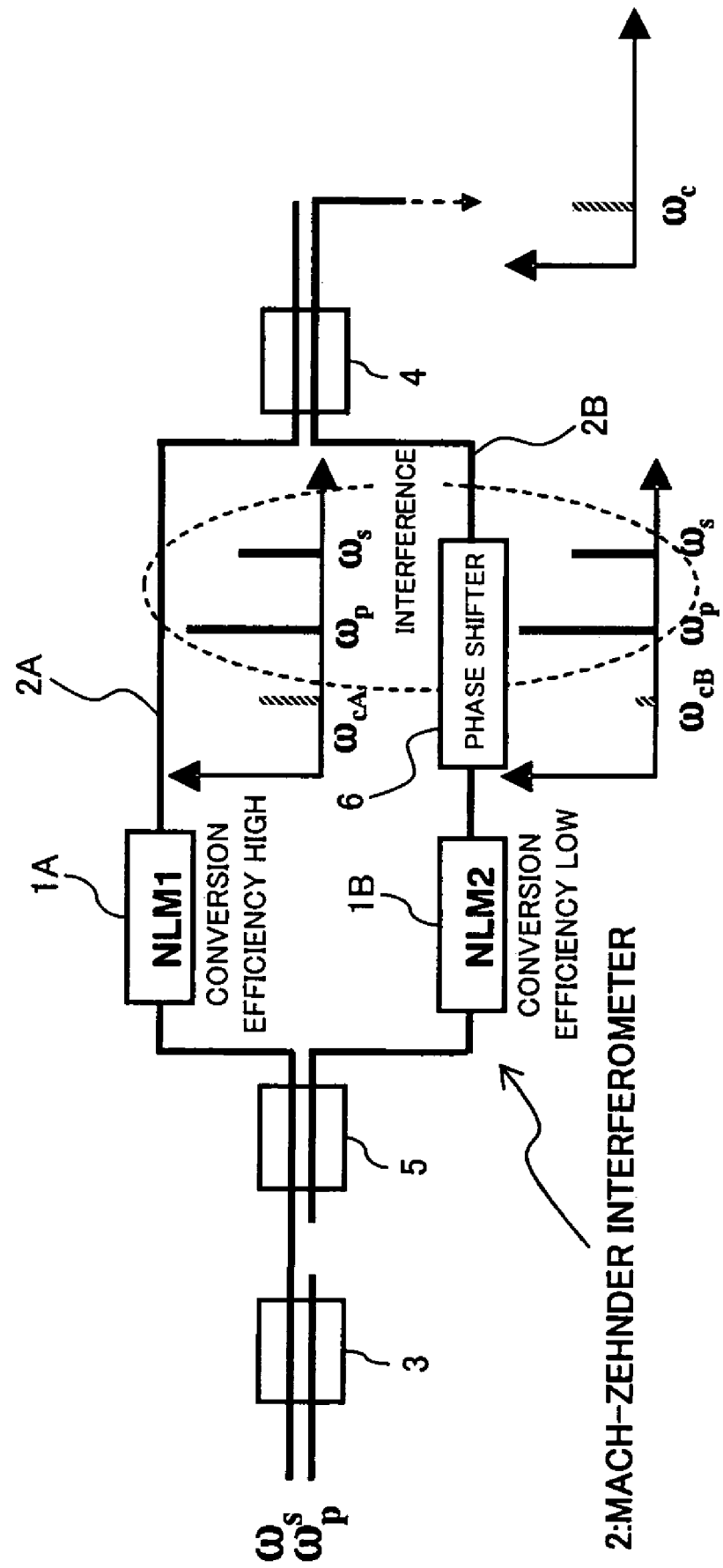
FIG. 4 is a schematic view illustrating a wavelength conversion system and a wavelength conversion method according to a second embodiment of the present invention.

In the following, wavelength conversion systems, optical integrated devices and wavelength conversion methods according to embodiments of the present invention are described.

First Embodiment

First, a wavelength conversion system, an optical integrated device and a wavelength conversion method according to a first embodiment of the present invention are described with reference to FIGS. 1 to 2(A) to 2(E).

The wavelength conversion system according to the present embodiment uses four wave mixing (FWM) as a non-linear effect of a non-linear medium (NLM). In particular, the wavelength conversion system makes use of the phenomenon that, if signal light $\omega_s$ and pumping light $\omega_p$ are inputted to a non-linear medium (here, a medium in which a third-order non-linear phenomenon occurs), then phase conjugate light $\omega_c$ ($=2\omega_p-\omega_s$) of the signal light is produced, to extract the phase conjugate light $\omega_c$ (phase conjugate light by a third-order non-linear phenomenon) produced by a non-linear medium to perform wavelength conversion.

Here, the non-linear medium may be, for example, a semiconductor optical amplifier (SOA) or a non-linear optical fiber (for example, a high non-linear optical fiber) which has a semiconductor gain medium.

Particularly, in the present embodiment, as seen in FIG. 1, a Mach-Zehnder interferometer 2 is used to extract the phase conjugate light $\omega_c$ produced by the non-linear medium (NLM) 1 as wavelength conversion light. In particular, in the present embodiment, the wavelength conversion system (apparatus) includes a Mach-Zehnder interferometer 2 having two optical waveguides 2A and 2B as shown in FIG. 1. Further, the non-linear medium 1 is provided on one of the Mach-Zehnder interferometer 2, that is, on the optical waveguide 2A such that light guided through the optical waveguide 2A of the Mach-Zehnder interferometer 2 and light guided through the other optical waveguide 2B interfere with each other so that phase conjugate light $\omega_c$ produced by the non-linear medium 1 is extracted as wavelength conversion light.

Here, in order to introduce multiplexed light produced by multiplexing the signal light $\omega_s$ and the pumping light $\omega_p$ into the Mach-Zehnder interferometer 2, a multiplexer 3 (here, a multiplexing coupler) is provided as seen in FIG. 1. Further, a coupler 4 (here, a 2×2 coupler; branching ratio of 1:1) is provided in order to cause light propagated along the two optical waveguides 2A and 2B of the Mach-Zehnder interferometer 2 to interfere with each other. In this instance, only the phase conjugate light $\omega_c$ is emitted as the wavelength conversion light from one of output ports of the coupler 4 as seen in FIG. 1.

Further, if the multiplexed light produced by multiplexing the signal light $\omega_s$ and the pumping light $\omega_p$ is introduced into the non-linear medium 1, then a gain is generated occasionally. The gain will make the powers (light intensities) of the light guided through the optical waveguide 2A, on which the non-linear medium 1 is provided, and the light guided through the optical waveguide 2B, on which the non-linear medium 1 is not provided, different from each other.

Therefore, in the present embodiment, in order that the powers (light intensities) of the signal light $\omega_s$ and the pumping light $\omega_p$ to be emitted from the optical waveguides 2A and 2B of the Mach-Zehnder interferometer 2 (two outputs of the Mach-Zehnder interferometer 2) may be equal to each other, a branching ratio adjuster 5 for adjusting the branching ratio of the multiplexed light produced by multiplexing the signal light $\omega_s$ and the pumping light $\omega_p$ is provided at a succeeding stage to the multiplexer 3 and a preceding stage to the Mach-Zehnder interferometer 2 as shown in FIG. 1. It is to be noted that, where the non-linear medium 1 is of the type which generates no gain, the branching ratio should be adjusted to 1:1 by means of the branching ratio adjuster 5.

Therefore, the branched lights whose branching ratio is adjusted by the branching ratio adjuster 5 are introduced into the two optical waveguides 2A and 2B of the Mach-Zehnder interferometer 2 (two input ports of the Mach-Zehnder interferometer 2).

Here, the branching ratio adjuster 5 is a branching ratio adjusting coupler (for example, a variable branching ratio coupler). It is to be noted that a Mach-Zehnder interferometer or the like may be used for the branching ratio adjuster 5 as hereinafter described.

Further, in the present embodiment, a phase shifter 6 (phase compensator) is provided on the other optical waveguide 2B (optical waveguide on which the non-linear medium 1 is not provided) of the Mach-Zehnder interferometer 2 as shown in FIG. 1 to effect phase adjustment so that the phases of the lights propagated through the two optical waveguides 2A and 2B may coincide with each other. It is to be noted that the phase shifter 6 may be provided on at least one of the two optical waveguides 2A and 2B of the Mach-Zehnder interferometer 2. Further, if it is possible to adjust the phases to each other by some other measures such as adjustment of the lengths of the two optical waveguides 2A and 2B of the Mach-Zehnder interferometer 2, then the phase shifter 6 need not be provided.

Now, a wavelength conversion method which uses such a wavelength conversion system as described above is described.

First, as seen in FIG. 1, multiplexed light produced by multiplexing signal light $\omega_s$ and pumping light $\omega_p$ is branched and introduced into the two optical waveguides 2A and 2B of the Mach-Zehnder interferometer 2. There upon, the branching ratio of the multiplexed light of the signal light $\omega_s$ and the pumping light $\omega_p$ is adjusted by means of the branching ratio adjuster 5 so that the powers (light intensities) of the signal light $\omega_s$ and the pumping light p to be emitted from the optical waveguides 2A and 2B which form the Mach-Zehnder interferometer 2 may be equal to each other. Then, the multiplexed lights whose branching ratio has been adjusted by the branching ratio adjuster 5 are individually introduced into the two optical waveguides 2A and 2B of the Mach-Zehnder interferometer 2.

When one of the multiplexed lights introduced into the optical waveguide 2A until it passes the non-linear medium 1 (NLM), phase conjugate light $\omega_c$ of the signal light is generated by the non-linear medium 1.

Thereafter, the light propagated through the optical waveguide 2A and the light propagated through the other optical waveguide 2B interfere with each other at the coupler 4 (at the branching ratio of 1:1). In this instance, the phase conjugate light $\omega_c$ is inputted only from the optical waveguide 2A, on which the non-linear medium 1 is provided, to and branched at 1:1 by the coupler 4, and is outputted from the two ports of the coupler 4. On the other hand, the signal light $\omega_s$ and the pumping light $\omega_p$ propagated through the optical waveguides 2A and 2B cancel each other at the coupler 4 and are not outputted from one of the ports of the coupler 4. Therefore, only the phase conjugate light $\omega_c$ is outputted from the one port of the coupler 4, and this is extracted as wavelength conversion light. Therefore, it is considered that the signal light $\omega_s$ is converted into the phase conjugate light $\omega_c$.

In the present embodiment, phase shifting is performed by the phase shifter 6 provided on the optical waveguide 2B on which the non-linear medium 1 is not provided so that the phases of the lights propagated through the two optical waveguides 2A and 2B may coincide with each other.

Now, an optical integrated device which uses the wavelength conversion system described above is described with reference to FIGS. 2(A) to 2(E).

It is to be noted that FIG. 2(B) is a schematic sectional view taken along line B-B' of FIG. 2(A); FIG. 2(C) is a schematic sectional view taken along line C-C' of FIG. 2(A); FIG. 2(D) is a schematic sectional view taken along line D-D' of FIG. 2(A); and FIG. 2(E) is a sectional view take along line E-E' of FIG. 2(A).

Referring first to FIG. 2(A), the present optical integrated device is formed as a monolithic integrated device wherein a pre-stage Mach-Zehnder interferometer 50 and phase shifters 51 and 52 which form the branching ratio adjuster 5 of the wavelength conversion system described herein above, and a post-stage Mach-Zehnder interferometer 20 and a semiconductor optical amplifier (SOA) 10, used as the non-linear medium 1, which form a wavelength conversion section (the Mach-Zehnder interferometer 2 and the non-linear medium 1 of the wavelength conversion system described hereinabove) for removing signal light $\omega_s$ and pumping light $\omega_p$ to selectively extract phase conjugate light $\omega_c$ are integrated monolithically.

It is to be noted that the multiplexer 3 of the wavelength conversion system described above is not shown in FIG. 2(A). Further, in FIG. 2(A), reference numeral 41 denotes an input side optical waveguide for inputting multiplexed light therethrough, and reference numeral 42 denotes an output side optical waveguide for outputting the phase conjugate light $\omega_c$ therethrough.

The pre-stage Mach-Zehnder interferometer 50 is provided at the preceding stage as viewed from the incoming side of light as seen in FIG. 2(A) and includes two optical waveguides 53 and 54 for branching and guiding multiplexed light of the signal light $\omega_s$ and the pumping light $\omega_p$. In other words, the pre-stage Mach-Zehnder interferometer 50 is composed of an input side coupler 55, an output side coupler 56, and two optical waveguides (slab waveguides) 53 and 54 for interconnecting the input side coupler 55 and the output side coupler 56.

The input side coupler 55 and the output side coupler 56 are multi-mode interference (MMI) couplers. It is to be noted here that, while an MMI coupler is used for the input side coupler 55 and the output side coupler 56 from the point of view of the controllability of the branching characteristic, the coupler to be used here is not limited to this, but, for example, a directional coupler or a Y-branching coupler may be used instead.

Each of the phase shifters 51 and 52 is configured such that it includes a phase shifting electrode 51A or 52A provided for a corresponding one of the two optical waveguides 53 and 54 which form the pre-stage Mach-Zehnder interferometer 50 so as to adjust the phase by injecting electric current into the optical waveguide 53 or 54 through the phase shifting electrode 51A or 52A as seen in FIG. 2(A). It is to be noted that a phase shifter may be provided on at least one of the two optical waveguides 53 and 54 which form the pre-stage Mach-Zehnder interferometer 50.

The post-stage Mach-Zehnder interferometer 20 is provided on the succeeding side as viewed from the incoming side of light as seen in FIG. 2(A) and includes an input side coupler 21, an output side coupler 22, and two optical waveguides (slab waveguides) 23 and 24 for interconnecting the input side coupler 21 and the output side coupler 22. It is to be noted here that the output side coupler 56 of the pre-stage Mach-Zehnder interferometer 50 described above is used also as the input side coupler 21.

The output side coupler 22 is a multi-mode interference (MMI) coupler. It is to be noted here that, while an MMI coupler is used for the output side coupler 22 from the point of view of the controllability of the branching characteristic, the coupler to be used here is not limited to this, but, for example, a directional coupler or a Y-branching coupler may be used instead.

The SOA 10 is provided on the optical waveguide 23 which form the post-stage Mach-Zehnder interferometer 20 as seen in FIG. 2(A). The SOA 10 includes an electrode 10X provided on an optical waveguide including an active layer made of a gain medium which generates a third-order non-linear phenomenon such that electric current (control current) can be injected into the active layer through the electrode 10X.

Further, in the present embodiment, multiplexed light whose branching ratio is adjusted by the pre-stage Mach-Zehnder interferometer 50 and the phase shifters 51 and 52 so that the powers (light intensities) of the signal light $\omega_s$ and the pumping light $\omega_p$ to be emitted from each of the two optical waveguides 23 and 24 which form the post-stage Mach-Zehnder interferometer 20 may be equal to each other is introduced into the two optical waveguides 23 and 24 which form the post-stage Mach-Zehnder interferometer 20. And then, the SOA 10 generates phase conjugate light $\omega_c$ of the signal light and the light guided through the optical waveguide 23 which forms the post-stage Mach-Zehnder interferometer 20 and the light guided through the other optical waveguide 24 of the post-stage Mach-Zehnder interferometer 20 interfere with each other so that the phase conjugate light $\omega_c$ is extracted as wavelength conversion light.

The branching ratio of the multiplexed light incoming to each of the two optical waveguides 23 and 24 which form the post-stage Mach-Zehnder interferometer 20 is adjusted in the following manner.

In particular, the multiplexed light produced by multiplexing the signal light $\omega_s$ and the pumping light $\omega_p$ is branched and introduced into the two optical waveguides 53 and 54 of the pre-stage Mach-Zehnder interferometer 50, and then, electric current is injected into the phase shifting electrodes 51A and 52A (phase shifters 51 and 52) provided in the pre-stage Mach-Zehnder interferometer 50 in response to a gain generated in the SOA 10 [that is, in response to the powers (light intensities) of the signal light $\omega_s$ and the pumping light $\omega_p$ amplified by the SOA 10]. As a result, the phases of the multiplexed light propagated through the optical waveguides 53 and 54 of the pre-stage Mach-Zehnder interferometer 50 are varied to adjust the branching ratio of the multiplexed light to be introduced into the optical waveguides 23 and 24 of the post-stage Mach-Zehnder interferometer 20 through the output side coupler 56 of the pre-stage Mach-Zehnder interferometer 50 (the output side coupler 56 serves also as the input side coupler 21 of the post-stage Mach-Zehnder interferometer 20).

Further, in the present embodiment, a phase shifter (phase compensator) 60 as the phase shifter 6 of the wavelength conversion system described hereinabove is provided on the other optical waveguide 24 of the post-stage Mach-Zehnder interferometer 20 (optical waveguide on which the non-linear is not provided) such that the phases of the lights propagated through the two optical waveguides 23 and 24 can be adjusted so as to coincide with each other as seen in FIG. 2(A).

Here, the phase adjust 60 includes a phase shifting electrode 60A provided on the optical waveguide 24 of the post-stage Mach-Zehnder interferometer 20 such that the phase is adjusted by injecting electric current to the optical waveguide 24 through the phase shifting electrode 60A. It is to be noted that the phase shifter 60 may be provided on at least one of the two optical waveguides 23 and 24 of the post-stage Mach-Zehnder interferometer 20. Further, if it is possible to adjust the phases to each other by some other measures such as adjustment of the lengths of the two optical waveguides 23 and 24 of the Mach-Zehnder interferometer 20, then the phase shifter need not be provided.

Now, a method of producing the optical integrated device according the present embodiment is described suitably with reference to FIGS. 2(A) to 2(E).

First, an n-InP cladding layer 61 (for example, of a thickness of 1 μm or less), a lower side SCH layer 62 (InGaAsP layer; optical guide layer; for example, of a light emission wavelength of 1.15 μm; for example, of a thickness of 50 nm), a strained quantum well active layer 63 (having, for example, six InGaAs well layers; for example, of a strain amount of +0.8%; for example, of a thickness of 100 nm), an upper side SCH layer 64 (InGaAsP layer; optical guide layer; for example, of a light emission wavelength of 1.15 μm; for example, of a thickness of 50 nm), and a p-InP cladding layer 65 (for example, of a thickness of 300 nm) are grown on a n-type InP substrate (n-InP substrate) 100, for example, by metal organic chemical vapor phase epitaxy (MOVPE) to form a stacked structure including the strained quantum well active layer 63 (SOA active layer) which forms an SOA as seen in FIG. 2(E).

Then, an $SiO_2$ mask (dielectric mask) is formed only over an area over which the SOA 10 is to be formed (refer to FIG. 2(A), and leaving this portion, the layers are removed, for example, by wet etching until the n-InP cladding layer 61 is exposed (that is, the layers from the p-InP cladding layer 65 to the lower side SCH layer 62 are removed).

Then, as seen in FIGS. 2(B) to 2(E), at the portion from which the layers are removed, a lower side SCH layer 62 (InGaAsP layer; optical guide layer; for example, of a light emission wavelength of 1.15 μm; for example, of a thickness of 50 nm), a waveguide core layer 66 (InGaAsP layer; for example, of a light emission wavelength of 1.3 μm; for example, of a thickness of 200 nm), an upper side SCH layer 64 (InGaAsP layer; optical guide layer; for example, of a light emission wavelength of 1.15 μm; for example, of a thickness of 50 nm), and a p-InP cladding layer 65 (for example, of a thickness of 300 nm) are butt joint grown, for example, by MOVPE or the like to form a stacked structure including the waveguide core layer 66.

Then, an $SiO_2$ mask is formed at portions at which the optical waveguides 23 and 24, 41, 42, 51 and 52 are to be formed, at portions at which the MMI couplers 55, 56 (21) and 22 are to be formed and at a portion at which the SOA 10 is to be formed [refer to FIG. 2(A)], and then dry etching such as, for example, ICP-RIE (Inductively Coupled Plasma Reactive Ion Etching) is performed to form a waveguide mesa structure, for example, of a height of 1.5 μm and a width of 1.5 μm as seen in FIGS. 2(B) to 2(E).

Then, a p-InP current block layer 67 (first current block layer) and an n-InP current block layer 68 (second current block layer) are grown on the opposite sides of the mesa structure, for example, by MOVPE to form a current constriction structure as seen in FIGS. 2(B) to 2(E).

After the current constriction structure is formed in this manner, the $SiO_2$ mask is removed, and a p-InP cladding layer 69 (for example, of a thickness of 3 μm) and an InGaAsP contact layer 70 (for example, of a light emission wavelength of 1.3 μm; for example, of a thickness of 100 nm) are grown at an upper portion thereby to complete the epitaxial growth as seen in FIGS. 2(B) to 2(E).

From the wafer on which the epitaxial growth is completed in this manner, the InGaAsP contact layer 70 is removed except at the portion at which the SOA 10 is to be formed and at the portions at which the phase shifters 60, 51 and 52 are to be formed, and a $SiO_2$ film 71 is formed. Thereafter, the $SiO_2$ film 71 at the portion at which the SOA 10 is to be formed and at the portions at which the phase shifters 60, 51 and 52 are to be formed (at the portions at which the InGaAsP contact layer 70 remains) is removed, and p side electrodes 51A, 52A and 60A are formed on the InGaAsP contact layer 70. Meanwhile, an n side electrode 73 is formed on the rear face of the substrate.

Finally, anti-reflection coating is applied to the opposite side faces of the device after cleavage thereby to complete the optical integrated device.

Accordingly, with the wavelength conversion system, optical integrated device and wavelength conversion method of the present embodiment, since an interference effect is used to remove signal light $\omega_s$ and pumping light $\omega_p$, there is an advantage that input signal light of any wavelength, any modulation speed and any modulation format can be converted into signal light of an arbitrary wavelength and only the wavelength conversion light can be extracted without using a filter (for example, without external provision of a variable wavelength filter). As a result, the number of parts can be reduced when compared with an alternative arrangement wherein a filter is used.

Also it becomes possible to achieve miniaturization and integration of apparatus. Particularly it is possible to integrate apparatus monolithically like the optical integrated device described herein above, and the functions of a conventional non-linear medium and variable wavelength filter can be implemented in a single device. Thus, further miniaturization of a device can be anticipated when compared with an alternative arrangement which uses a filter.

Furthermore, since no filter is required, the restriction to the width of wavelength conversion by the bandwidth or the wavelength sweeping width is eliminated, and higher speed wavelength conversion can be anticipated.

It is to be noted that, while, in the embodiment described above, an optical integrated device which includes a semiconductor optical amplifier as a non-linear medium is used as an example of adaptation of the wavelength conversion system described hereinabove, the adaptation of the wavelength conversion system is not limited to this.

For example, it is otherwise possible to form the Mach-Zehnder interferometer 2 of the wavelength conversion system described above from an optical fiber and form a wavelength conversion apparatus wherein a non-linear fiber is used as a non-linear medium.

Such a wavelength conversion apparatus as just described may be configured in such a manner as shown in FIG. 3. Referring to FIG. 3, the two optical waveguides 2A and 2B of the Mach-Zehnder interferometer 2 are formed from polarization maintaining optical fibers (PMF) 84 and 85 and the non-linear medium 1 provided on the optical waveguide 2A is formed from a polarization maintaining highly non-linear fiber (PM-HNF) 86 while the phase shifter 6 provided on the other optical waveguide 2B is formed from a polarization controller (PC) 87. Incidentally, in FIG. 3, the same components as those in the first embodiment described above (refer to FIG. 1) are assigned with the same reference numerals.

It is to be noted here that polarization controllers (PC) 82 and 83 are provided for an optical waveguide 80 for inputting signal light $\omega_s$ therethrough and an optical waveguide 81 for inputting the pumping light $\omega_p$ therethrough, respectively. Further, the polarization maintaining optical fibers 84 and 85 serving as the two optical waveguides 2A and 2B of the Mach-Zehnder interferometer 2 have lengths equal to each other.

Second Embodiment

A wavelength conversion system, an optical integrated device and a wavelength conversion method according to a second embodiment of the present invention are described below with reference to FIGS. 4 and 5(A) to 5(E).

The wavelength conversion system according to the present embodiment is similar to that of the first embodiment described hereinabove except that two optical waveguides of a Mach-Zehnder interferometer are respectively provided with non-linear media which have non-linear susceptibilities (here, third-order non-linear susceptibilities $\chi^{(3)}$) different from each other but generate gains (linear gains) equal to each other (including non-linear media which generate no gain) while no branching ratio adjuster is provided.

In particular, the present wavelength conversion system (apparatus) includes a Mach-Zehnder interferometer 2 having two optical waveguides 2A and 2B as seen in FIG. 4, and non-linear media 1A and 1B having different non-linear susceptibilities from each other and generating equal gains (including no gains) to each other are provided on the two optical waveguides 2A and 2B, respectively, of the Mach-Zehnder interferometer 2 such that light guided through the optical waveguide 2A of the Mach-Zehnder interferometer 2 and light guide through the other optical waveguide 2B of the Mach-Zehnder interferometer 2 interfere with each other and phase conjugate light $\omega_c$ outputted as the difference in power (light intensity) between phase conjugate light $\omega_{cA}$ produced by the non-linear medium 1A and phase conjugate light $\omega_{cB}$ produced by the non-linear medium 1B is extracted as wavelength conversion light. Incidentally, in FIG. 4, the same components as those in the first embodiment described above (refer to FIG. 1) are assigned with the same reference numerals.

The non-linear susceptibility is a parameter which determines a wavelength conversion efficiency, and as the value of the non-linear susceptibility increases, the wavelength conversion efficiency increases.

For example, the non-linear susceptibilities of the non-linear medium (first non-linear medium) 1A provided on the optical waveguide 2A of the Mach-Zehnder interferometer 2 and the non-linear medium (second non-linear medium) 1B provided on the other optical waveguide 2B may be set such that the non-linear susceptibility of the non-linear medium 1A is higher (or lower) than that of the non-linear medium 1B.

The first non-linear medium 1A having a higher non-linear susceptibility is used to generate phase conjugate light $\omega_c$ to be extracted as wavelength conversion light. Therefore, the first non-linear medium 1A is called wavelength conversion light producing non-linear medium. Meanwhile, the second non-linear medium 1B having a lower non-linear susceptibility is used to make the power (light intensity) of the signal light $\omega_s$ and the pumping light $\omega_p$ having passed through the first non-linear medium 1A and the power (light intensity) of the signal light $\omega_s$ and the pumping light $\omega_p$ having passed through the second non-linear medium 1B equal to each other. Therefore, the second non-linear medium 1B is called output adjusting non-linear medium.

In this instance, when multiplex light of signal light $\omega_s$ and pumping light $\omega_p$ is branched and introduced into the two optical waveguides 2A and 2B of the Mach-Zehnder interferometer 2, the first non-linear medium 1A provided on the optical waveguide 2A of the Mach-Zehnder interferometer 2 and the second non-linear medium 1B provided on the other optical waveguide 2B generate phase conjugate lights $\omega_{cA}$ and $\omega_{cB}$ of the signal light $\omega_s$, respectively.

However, since the first non-linear medium 1A and the second non-linear medium 1B have different non-linear susceptibilities from each other, a difference appears between the powers (light intensities) of the phase conjugate lights $\omega_{cA}$ and $\omega_{cB}$ generated in the non-linear media 1A and 1B, respectively.

Therefore, even if the light guided through the optical waveguide 2A of the Mach-Zehnder interferometer 2 and the light guided through the other optical waveguide 2B interfere with each other, the phase conjugate lights $\omega_{cA}$ and $\omega_{cB}$ do not fully cancel each other but are outputted.

In this manner, in the present embodiment, the phase conjugate light $\omega_c$ is extracted as wavelength conversion light making use of the phenomenon that non-linear media having different non-linear susceptibilities from each other generate phase conjugate lights between which a power difference (light intensity difference) appears and which therefore do not cancel each other.

Particularly, in the present embodiment, since the non-linear media 1A and 1B provided on the two optical waveguides 2A and 2B of the Mach-Zehnder interferometer 2 generate an equal gain, the powers of the light (light outputs; light intensities) having guided through the optical waveguides 2A and 2B become equal to each other. Therefore, the branching ratio adjuster 5 in the first embodiment described hereinabove is not provided. In other words, the second non-linear medium 1B having a different non-linear susceptibility is provided on the optical waveguide 2B in place of the branching ratio adjuster 5 in the first embodiment described above so that the powers (light intensities) of the signal light $\omega_s$ and the pumping light $\omega_p$ to be emitted from the optical waveguides 2A and 2B of the Mach-Zehnder interferometer 2 (two output ports of the Mach-Zehnder interferometer 2) may be equal to each other.

It is to be noted that the configuration of the other part of the present embodiment is same as that of the first embodiment described herein above.

Now, a wavelength conversion method in which such a wavelength conversion system as described above is described.

First, multiplexed light of signal light $\omega_s$ and pumping light $\omega_p$ is branched and introduced into the two optical waveguides 2A and 2B of the Mach-Zehnder interferometer 2.

When the multiplexed lights introduced into the two optical waveguides 2A and 2B propagate and pass the non-linear media (NLM) 1A and 1B, respectively, phase conjugate lights $\omega_{cA}$ and $\omega_{cB}$ of the signal light are generated by the non-linear media 1A and 1B, respectively. In particular, the phase conjugate light $\omega_{cA}$ of the signal light is generated by the first non-linear medium 1A provided on the optical waveguide 2A of the Mach-Zehnder interferometer 2 while the phase conjugate light $\omega_{cB}$ of the signal light is generated by the second non-linear medium 1B provided on the other optical waveguide 2B and having a non-linear susceptibility different from that of the first non-linear medium 1A.

In the present embodiment, since an equal gain is generated by the non-linear media 1A and 1B, the powers (light intensities) of the light guided through the optical waveguide 2A and the light guided through the other optical waveguide 2B become equal to each other. On the other hand, since the non-linear media 1A and 1B provided on the two optical waveguides 2A and 2B of the Mach-Zehnder interferometer 2, respectively, have different non-linear susceptibilities from each other, a difference appears between the powers (light intensities) of the phase conjugate lights $\omega_{cA}$ and $\omega_{cB}$ generated by the non-linear media 1A and 1B, respectively. Here, since the non-linear susceptibility of the second non-linear medium 1B is lower, the power (light intensity) of the phase conjugate light $\omega_{cA}$ generated by the first non-linear medium 1A is lower.

Then, the light guided through the optical waveguide 2A and the light guided through the optical waveguide 2B interfere with each other at the coupler 4 (at the branching ratio of 1:1).

In the present embodiment, since a difference is provided between the powers (light intensities) of the phase conjugate lights $\omega_{cA}$ and $\omega_{cB}$ generated by the non-linear media 1A and 1B, the phase conjugate lights $\omega_{cA}$ and $\omega_{cB}$ do not fully cancel each other but are outputted individually from the two ports of the coupler 4. Meanwhile, the signal lights $\omega_s$ and the pumping lights $\omega_p$ having propagated through the optical waveguides 2A and 2B cancel each other at the coupler 4 and are not outputted from one of the ports of the coupler 4. Therefore, from the one of the ports of the coupler 4, only the phase conjugate light $\omega_c$ ($=\omega_{cA}-\omega_{cB}$) is outputted, and this is extracted as wavelength conversion light. Consequently, the signal light $\omega_s$ is converted into the phase conjugate light $\omega_c$.

In the present embodiment, phase shifting is performed by the phase shifter 6 provided on the optical waveguide 2B so that the phases of the lights having propagated through the two optical waveguides 2A and 2B may coincide with each other.

Now, an optical integrated device which uses the wavelength conversion system described hereinabove is described with reference to FIGS. 5(A) to 5(E).

Figure 5A:
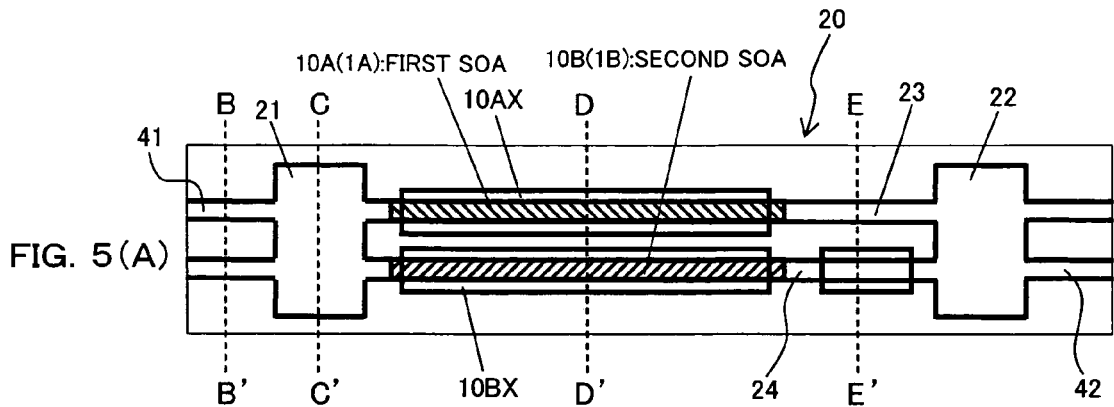
FIGS. 5(A) to 5(E) are schematic views illustrating a configuration and a production method of an optical integrated device according to the second embodiment of the present invention.
Figure 5B:
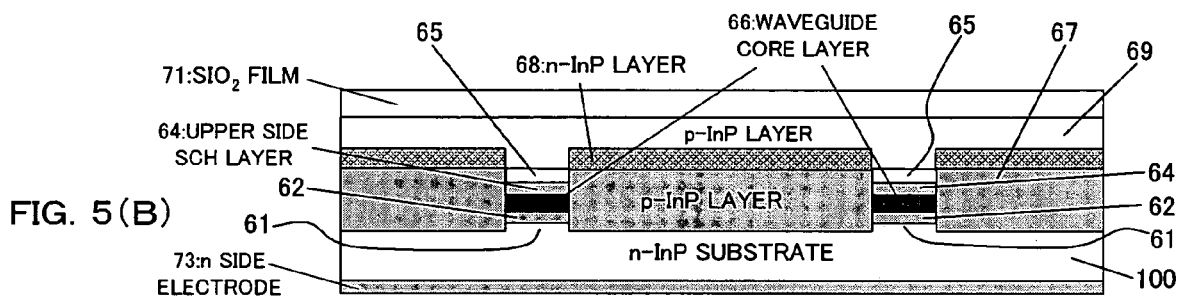
Figure 5C:
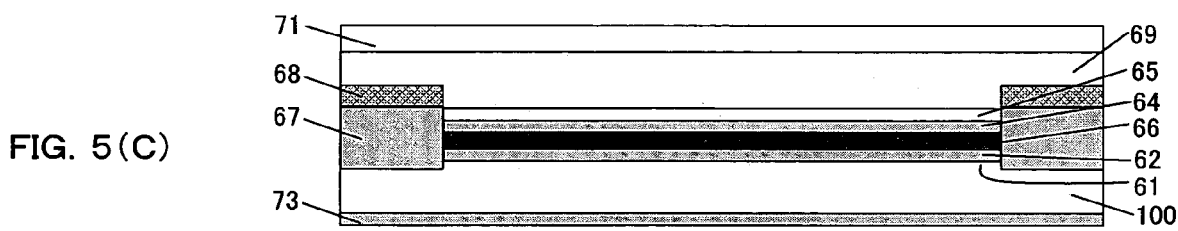
Figure 5D:
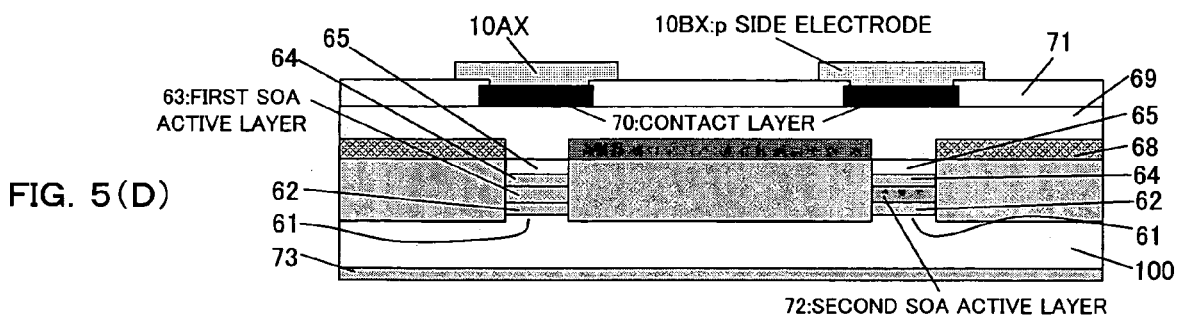
Figure 5E:
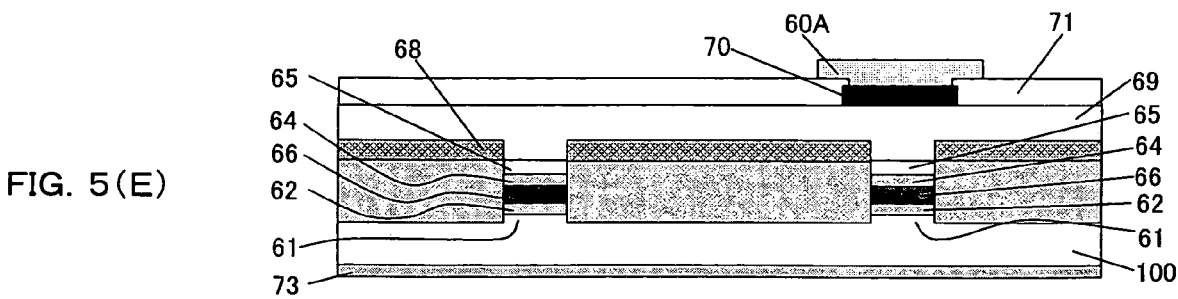
Figure 6:
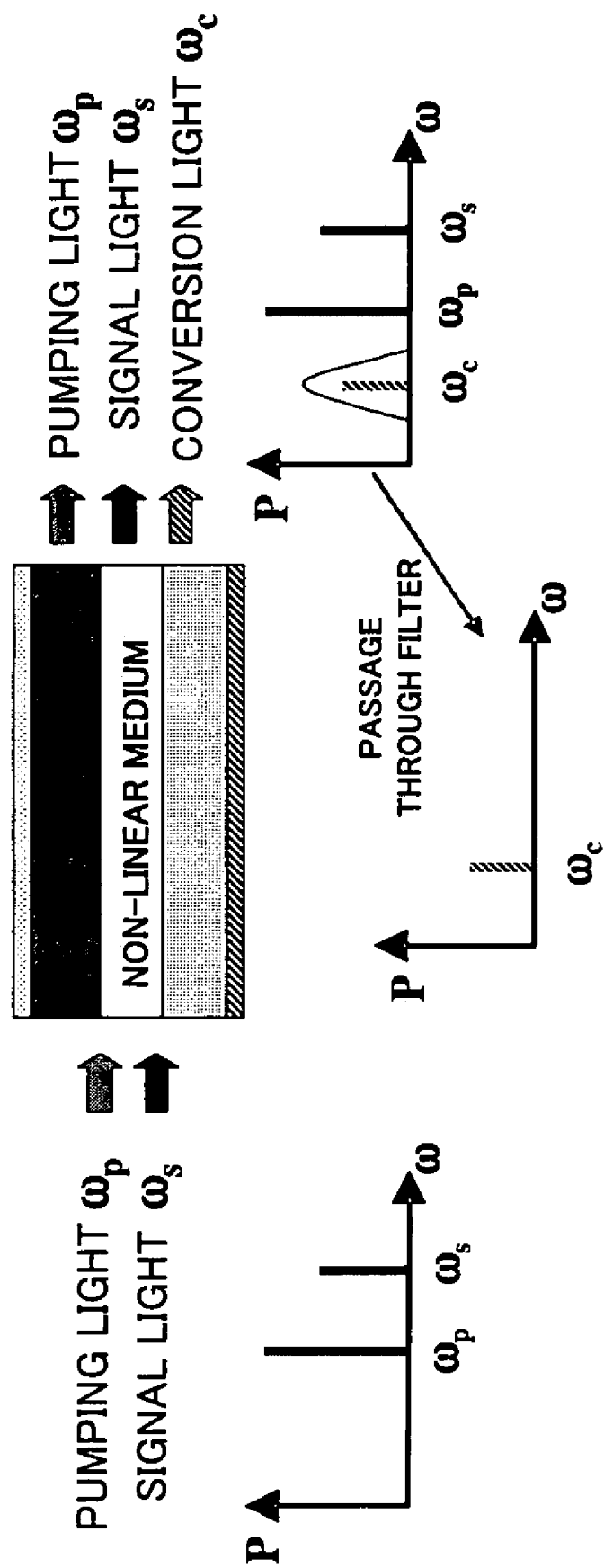
FIG. 6 is a schematic view illustrating a wavelength conversion system which uses popular four wave mixing.

It is to be noted that FIG. 5(B) is a schematic sectional view taken along line B-B' of FIG. 5(A); FIG. 5(C) is a schematic sectional view taken along line C-C' of FIG. 5(A); FIG. 5(D) is a schematic sectional view taken along line D-D' of FIG. 5(A); and FIG. 5(E) is a schematic sectional view taken along line E-E' of FIG. 5(A).

Referring first to FIG. 5(A), the present optical integrated device is formed as a monolithic integrated device wherein, as a wavelength conversion section (Mach-Zehnder interferometer 2 and non-linear media 1A and 1B of the wavelength conversion system described hereinabove) for removing signal light $\omega_s$ and pumping light $\omega_p$ to selectively extract phase conjugate light $\omega_c$ a post-stage Mach-Zehnder interferometer 20, a first semiconductor optical amplifier (first SOA) 10A used as the first non-linear medium 1A of the wavelength conversion system described hereinabove, and a second semiconductor optical amplifier (second SOA) 10B used as the second non-linear medium 1B of the wavelength conversion system described hereinabove are integrated monolithically. Incidentally, in FIGS. 5(A) to 5(E), the same components as those in the first embodiment described above (refer to FIGS. 2(A) to 2(E)) are assigned with the same reference numerals.

The post-stage Mach-Zehnder interferometer 20 includes an input side coupler 21, an output side coupler 22, and two optical waveguides (slab waveguides) 23 and 24 for interconnecting the input side coupler 21 and the output side coupler 22 as seen in FIG. 5(A).

Each of the first SOA 10A and the second SOA 10B is provided on a corresponding one of the two optical waveguides 23 and 24 which form the post-stage Mach-Zehnder interferometer 20 as shown in FIG. 5(A). Each of the first SOA 10A and the second SOA 10B includes an electrode 10AX or 10BX provided on an optical waveguide including an active layer made of a gain medium which generates a third-order non-linear phenomenon such that electric current (control current) can be injected into the active layer through the electrode 10AX or 10BX.

Here, the non-linear susceptibility of the first SOA 10A is set higher than that of the second SOA 10B. More particularly, the first SOA 10A and the second SOA 10B may be configured in the following manner.

(1) The first SOA 10A is formed as a bulk SOA while the second SOA 10B is formed as a strained quantum well SOA. (2) The first SOA 10A is formed as a bulk SOA while the second SOA 10B is formed as a quantum dot SOA. (3) The first SOA 10A is formed as a non-strained quantum well SOA while the second SOA 10B is formed as a strained quantum well SOA. (4) The first SOA 10A is formed as anon-strained quantum well SOA while the second SOA 10B is formed as a quantum dot SOA.

It is to be noted that the non-linear susceptibility of the first SOA 10A may be set lower than that of the second SOA 10B. In this instance, the first SOA 10A and the second SOA 10B may be configured in the following manner.

(1) The first SOA 10A is formed as a strained quantum well SOA while the second SOA 10B is formed as a bulk SOA. (2) The first SOA 10A is formed as a quantum dot SOA while the second SOA 10B is formed as a bulk SOA. (3) The first SOA 10A is formed as a strained quantum well SOA while the second SOA 10B is formed as a non-strained quantum well SOA. (4) The first SOA 10A is formed as a quantum dot SOA while the second SOA 10B is formed as a non-strained quantum well SOA.

In this manner, the first SOA 10A and the second SOA 10B may be formed so as to include different active layers having different non-linear susceptibilities from each other. For example, the first SOA 10A may be formed so as to include active layers composed of any one type of configurations chosen from group including bulk, non-strained quantum well, strained quantum well and quantum dot layers while the second SOA 10B is formed so as to include one of such active layers as mentioned above which is different from that of the first SOA 10A. It is to be noted that the first SOA 10A and the second SOA 10B may otherwise be configured so as to include active layers of the same type but having different non-linear susceptibilities from each other.

Further, the present optical integrated device is configured such that the first SOA 10A and the second SOA 10B generate an equal gain so that the powers (light intensities) of the signal light $\omega_s$ and the pumping light $\omega_p$ to be emitted from the two optical waveguides 23 and 24 which form the post-stage Mach-Zehnder interferometer 20 may be equal to each other.

Then, the multiplex light of the signal light $\omega_s$ and the pumping light $\omega_p$ is introduced into the two optical waveguides 23 and 24 which form the post-stage Mach-Zehnder interferometer 20, and the first SOA 10A and the second SOA 10B generate phase conjugate lights $\omega_{cA}$ and $\omega_{cB}$ of the signal light $\omega_s$ respectively. Then, the light propagated through the optical waveguide 23 and the light propagated through the other optical waveguide 24 interfere with each other, and the phase conjugate light $\omega_c$ ($=\omega_{cA}-\omega_{cB}$) is extracted as wavelength conversion light.

Further, in the present embodiment, a phase shifter 60 (phase compensator) is provided as the phase shifter 6 of the wavelength conversion system described hereinabove on one of the two optical waveguides 23 and 24 of the post-stage Mach-Zehnder interferometer 20 (here, on the optical waveguide 24) as seen in FIG. 5(A) such that phase shifting can be performed so that the phases of the lights having propagated through the two optical waveguides 23 and 24 may coincide with each other. Here, the phase shifter 60 includes a phase shifting electrode 60A (the region in which the electrode is provided is referred to as current injection region) provided on one of the optical waveguides of the post-stage Mach-Zehnder interferometer 20 (here, on the optical waveguide 24) such that current is injected into the optical waveguide 24 through the phase shifting electrode 60A to perform the phase adjustment. It is to be noted that, if it is possible to adjust the phases to each other by some other measures such as adjustment of the lengths of the two optical waveguides 23 and 24 of the Mach-Zehnder interferometer 20, then the phase shifter need not be provided.

Now, a method of producing the optical integrated device according the present embodiment is described suitably with reference to FIGS. 5(A) to 5(E). Incidentally, in FIGS. 5(A) to 5(E), the same components as those in the first embodiment described above (refer to FIGS. 2(A) to 2(E)) are assigned with the same reference numerals.

First, an n-InP cladding layer 61 (for example, of a thickness of 1 μm or less), a lower side SCH layer 62 (InGaAsP layer; optical guide layer; for example, of a light emission wavelength of 1.15 μm; for example, of a thickness of 50 nm), a strained quantum well active layer 63 (having, for example, six InGaAs well layers; for example, of a strain amount of +0.8%; for example, of a thickness of 100 nm), an upper side SCH layer 64 (InGaAsP layer; optical guide layer; for example, of a light emission wavelength of 1.15 μm; for example, of a thickness of 50 nm), and a p-InP cladding layer 65 (for example, of a thickness of 300 nm) are grown on an n-type InP substrate (n-InP substrate) 100, for example, by metal organic chemical vapor phase epitaxy (MOVPE) to form a stacked structure including the strained quantum well active layer 63 (first SOA active layer) which forms the first SOA 10A as seen FIG. 5(E).

Then, an SiO$_2$ mask (dielectric mask) is formed only at a portion at which the first SOA 10A is to be formed (refer to FIG. 5(A), and leaving this portion, the layers are removed, for example, by wet etching until the n-InP cladding layer 61 is exposed (that is, the layers from the p-InP cladding layer 65 on the front face side to the lower side SCH layer 62 are removed).

Then, as seen in FIGS. 5(B) to 5(E), at the portion from which the layers are removed, a lower side SCH layer 62 (InGaAsP layer; optical guide layer; for example, of a light emission wavelength of 1.15 μm; for example, of a thickness of 50 nm), a non-strained quantum well active layer 72 (having three InGaAs well layers; for example, of a thickness of 70 nm), an upper side SCH layer 64 (InGaAsP layer; optical guide layer; for example, of a light emission wavelength of 1.15 μm; for example, of a thickness of 50 nm), and a p-InP cladding layer 65 (for example, of a thickness of 300 nm) are grown, for example, by MOVPE to form a stacked structure including the non-strained quantum well active layer 72 (second SOA active layer) which forms the second SOA 10B.

Then, an SiO$_2$ mask is formed only at portions at which the first SOA 10A and the second SOA 10B are to be formed [refer to FIG. 5(A)], and leaving the portions, the layers are removed, for example, by wet etching until the n-InP cladding layer 61 is exposed (that is, the layers from the p-InP cladding layer 65 on the front surface side to the lower side SCH layer 62 are removed).

After the etching is performed in this manner, as seen in FIGS. 5(B) to 5(E), at the portions from which the layers are removed, a lower side SCH layer 62 (InGaAsP layer; optical guide layer; for example, of a light emission wavelength of 1.15 μm; for example, of a thickness of 50 nm), a waveguide core layer 66 (InGaAsP layer; for example, of a light emission wavelength of 1.3 μm; for example, of a thickness of 200 nm), an upper side SCH layer 64 (InGaAsP layer; optical guide layer; for example, of a light emission wavelength of 1.15 μm; for example, of a thickness of 50 nm), and a p-InP cladding layer 65 (for example, of a thickness of 300 nm) are butt joint grown, for example, by MOVPE or the like to form a stacked structure including the waveguide core layer 66.

Then, an SiO$_2$ mask is formed at portions at which the optical waveguides 23, 24, 41 and 42 are to be formed, at portions at which the MMI couplers 21 and 22 are to be formed and at portions at which the SOAs 10A and 10B are to be formed [refer to FIG. 5(A)], and then dry etching such as, for example, ICP-RIE (Inductively Coupled Plasma Reactive Ion Etching) is performed to form a waveguide mesa structure, for example, of a height of 1.5 μm and a width of 1.5 μm as seen in FIGS. 5(A) to 5(E).

Then, a p-InP current block layer 67 (first current block layer) and an n-InP current block layer 68 (second current block layer) are grown on the opposite sides of the mesa structure, for example, by MOVPE or the like to form a current constriction structure as seen in FIGS. 5(A) to 5(E).

After the current constriction structure is formed in this manner, the SiO$_2$ mask is removed, and a p-InP cladding layer 69 (for example, of a thickness of 3 μm) and an InGaAsP contact layer 70 (for example, of a light emission wavelength of 1.3 μm; for example, of a thickness of 100 nm) are grown at an upper portion thereby to complete the epitaxial growth as seen in FIGS. 5(B) to (E).

From the wafer on which the epitaxial growth is completed in this manner, the InGaAsP contact layer 70 is removed except at the portions at which the first SOA 10A and the second SOA 10B are to be formed and at the portion at which the phase shifter 60 is to be formed, and then a SiO$_2$ film 71 is formed as seen in FIGS. 5(A) to (E). Thereafter, the SiO$_2$ film 71 at the portions at which the first SOA 10A and the second SOA 10B are to be formed and at the portion at which the phase shifter 60 is to be formed (at the portions at which the contact layer 70 remains) is removed, and p side electrodes 60AX, 10AX and 10BX are formed on the InGaAsP contact layer 70. Meanwhile, an n side electrode 73 is formed on the rear face of the substrate.

Finally, anti-reflection coating is applied to the opposite side faces of the device after cleavage thereby to complete the optical integrated device.

Accordingly, according to the wavelength conversion system, optical integrated device and wavelength conversion method of the present embodiment, similar advantages to those of the first embodiment described hereinabove are achieved. Further, since the branching ratio adjustment section in the first embodiment described hereinabove need not be provided, further miniaturization can be anticipated.

It is to be noted that, while, in the present embodiment, the non-linear media 1A and 1B generate gains equal to each other (including a case wherein no gains are generated), the non-linear media are not limited to them. For example, non-linear media having different gains from each other may be provided while the branching ratio adjuster in the first embodiment described above is provided.

OTHERS

It is to be noted that the stacked structure and the production method of an optical integrated device are not limited to those of the embodiments described hereinabove. Further, while the embodiments described hereinabove use a mesa structure of the buried type, alternative structures such as a high mesa structure which does not involve such burying or a ridge structure may be used. Also in this instance, similar advantages to those described hereinabove can be achieved.

The present invention is not limited to the embodiment specifically described above, and variations and modifications can be made without departing from the scope of the present invention.

What is claimed is:

1. A wavelength conversion system, comprising:
   a Mach-Zehnder interferometer including two optical waveguides;
   a non-linear medium provided on only one of the two optical waveguides, in which a third-order non-linear phenomenon occurs such that wavelength conversion is performed using four wave mixing; and
   a branching ratio adjustment section configured to adjust the branching ratio of multiplexed light produced by multiplexing signal light and pumping light so that the powers of the signal light and the pumping light which are to be emitted from the two optical waveguides are equal to each other;
   wherein said wavelength conversion system is configured such that the multiplexed light whose branching ratio is adjusted by said branching ratio adjustment section is introduced into the two optical waveguides, said non-linear medium generates phase conjugation light of the signal light by the third-order non-linear phenomenon and the light guided through the one optical waveguide and the light guided through the other one of the two optical waveguides interfere with each other so that the phase conjugation light is extracted as wavelength conversion light.

2. The wavelength conversion system as claimed in claim 1, further comprising a phase shifter provided on at least one of the two optical waveguides.

3. The wavelength conversion system as claimed in claim 1, wherein said non-linear medium is a semiconductor optical amplifier.

4. The wavelength conversion system as set forth in claim 1, wherein said non-linear medium is a non-linear optical fiber.

5. The wavelength conversion system as claimed in claim 1, wherein said branching ratio adjustment section is formed from a coupler.

6. The wavelength conversion system as claimed in claim 1, wherein said branching ratio adjustment section is formed from a Mach-Zehnder interferometer.

7. An optical integrated device, comprising:
   a pre-stage Mach-Zehnder interferometer including two optical waveguides for branching and guiding multiplexed light produced by multiplexing signal light and pumping light;
   a phase shifter provided on at least one of the two optical waveguides which form said pre-stage Mach-Zehnder interferometer;
   a post-stage Mach-Zehnder interferometer including an input side coupler, an output side coupler, and two optical waveguides for connecting said input side coupler and said output side coupler to each other; and
   a semiconductor optical amplifier provided on only one of the two optical waveguides which form said post-stage Mach-Zehnder interferometer, in which a third-order non-linear phenomenon occurs such that wavelength conversion is performed using four wave mixing;
   wherein said optical integrated device configured such that the multiplexed light whose branching ratio is adjusted by said pre-stage Mach-Zehnder interferometer and said phase shifter so that the powers of the signal light and the pumping light to be individually emitted from the two optical waveguides which form said post-stage Mach-Zehnder interferometer are equal to each other is introduced into the two optical waveguides which form said post-stage Mach-Zehnder interferometer, said semiconductor optical amplifier generates phase conjugation light of the signal light by the third-order non-linear phenomenon and the light guided through the one optical waveguide which forms said post-stage Mach-Zehnder interferometer and the light guided through the other one of the two optical waveguides which form said post-stage Mach-Zehnder interferometer interfere with each other so that the phase conjugation light is extracted as wavelength conversion light.

8. The optical integrated device as claimed in claim 7 further comprising a phase shifter provided on at least one of the two optical waveguides which form said post-stage Mach-Zehnder interferometer.

9. The optical integrated device as claimed in claim 7, wherein each of said input side coupler and said output side coupler is a multi-mode interference coupler.

10. The optical integrated device as claimed in claim 7, wherein each of said input side coupler and said output side coupler is a directional coupler.

11. A wavelength conversion method, comprising the steps of:
    adjusting a branching ratio of multiplexed light produced by multiplexing signal light and pumping light emitted from two optical waveguides which form a Mach-Zehnder interferometer so that the powers of the signal light and pumping light are equal to each other;
    introducing the multiplexed light whose branching ratio is adjusted into the two individual optical waveguides;
    generating phase conjugation light of the signal light by means of a non-linear medium provided on only one of the two optical waveguides, in which a third-order non-linear phenomenon occurs such that wavelength conversion is performed using four wave mixing; and
    causing the light guided through the one optical waveguide with a gain generated by the non-linear medium and the light guided through the other one of the two optical waveguides to interfere with each other so that the phase conjugation light is extracted as wavelength conversion light.

12. The wavelength conversion method as claimed in claim 11, wherein the phases of the light guided through one of the two optical waveguides and the light guided through the other one of the two optical waveguides are additionally adjusted by a phase shifter provided on at least one of the two optical waveguides.

* * * * *